US007818810B2

(12) United States Patent
McArdle

(10) Patent No.: US 7,818,810 B2
(45) Date of Patent: Oct. 19, 2010

(54) CONTROL OF DOCUMENT CONTENT HAVING EXTRACTION PERMISSIVES

(75) Inventor: James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1412 days.

(21) Appl. No.: 11/246,786

(22) Filed: Oct. 7, 2005

(65) Prior Publication Data
US 2007/0083934 A1 Apr. 12, 2007

(51) Int. Cl.
*G06F 17/30* (2006.01)
(52) U.S. Cl. .............................. 726/26; 726/27; 726/28; 713/187
(58) Field of Classification Search .................. 726/26, 726/27, 28, 30; 713/153, 154, 156, 157–190; 380/282, 283, 284–315
See application file for complete search history.

(56) References Cited

U.S. PATENT DOCUMENTS

| 5,285,526 | A | 2/1994 | Bennett, III et al. |
| 5,428,529 | A | 6/1995 | Hartrick et al. |
| 5,818,933 | A | 10/1998 | Kambe |
| 6,272,635 | B1 | 8/2001 | Saito |
| 6,496,841 | B1 | 12/2002 | Tognazzini |
| 6,643,774 | B1 | 11/2003 | McGarvey |
| 6,820,079 | B1 | 11/2004 | Evans |
| 7,415,721 | B2 * | 8/2008 | Fransdonk ..................... 726/4 |
| 7,467,415 | B2 * | 12/2008 | Carter .......................... 726/27 |
| 7,546,334 | B2 * | 6/2009 | Redlich et al. ............... 709/201 |
| 2002/0143520 | A1 | 10/2002 | Gauthier |
| 2003/0163684 | A1 * | 8/2003 | Fransdonk .................... 713/153 |
| 2006/0107326 | A1 * | 5/2006 | DeMartini et al. ............. 726/26 |

FOREIGN PATENT DOCUMENTS

JP 2001-195400 7/2001

OTHER PUBLICATIONS

Coombs, et al.—"Markup Systems and the Future of Scholarly Text Processing", Communications of the ACM, vol. 30, No. 11, Nov. 1987, pp. 933-947.

* cited by examiner

*Primary Examiner*—Pramila Parthasarathy
(74) *Attorney, Agent, or Firm*—Libby Z. Toub; Jeffrey L. Streets; Streets & Steele

(57) ABSTRACT

Control of an original document content having permissives includes systems, computer program products and methods that include limiting extractions from the original document to discrete defined portions by enforcing one or more extraction permissives associated with the document and decrypting the document to allow displaying the document only through a document control editor that is capable of identifying and enforcing the extraction permissives. The method may further include assembling a manuscript having an extracted portion from the original document and one or more extraction permissives associated with the extracted portion, wherein the extracted portion can be displayed in decrypted form only through the document control editor. The manuscript may be sent to a publishing authority of the original document for receiving permission to publish the manuscript containing the extracted portion and further receiving a new permissive in the manuscript inserted by the publishing authority and directed to the extracted portion.

17 Claims, 6 Drawing Sheets

[P]WE HOLD THESE TRUTHS TO BE SELF-EVIDENT, THAT
ALL MEN ARE CREATED EQUAL, THAT THEY ARE ENDOWED ⎫— PARAGRAPH 28
BY THEIR CREATOR WITH CERTAIN UNALIENABLE RIGHTS, ⎭
THAT AMONG THESE ARE[/P]
[LIST]
   [LI]LIFE,[/LI] ← 32
    [LI]LIBERTY AND[/LI] ← 34 — LIST 30
    [LI]THE PURSUIT OF HAPPINESS.[/LI] ← 36
[/LIST]
[P]THAT TO SECURE THESE RIGHTS, GOVERNMENTS ARE ⎫
INSTITUTED AMONG MEN, DERIVING THEIR JUST POWERS ⎬— PARAGRAPH 38
FROM THE CONSENT OF THE GOVERNED.[/P] ⎭

*FIG. 1*
*(Prior Art)*

[P] WE HOLD THESE TRUTHS TO B E SELF-EVIDENT, THAT ALL MEN ARE CREATED EQUAL, THAT THEY ARE ENDOWED BY THEIR CREATOR WITH CERTAIN UNALIENABLE RIGHTS, THAT AMONG THESE ARE [/P] [LIST] [LI] LIFE, [/LI] [LI] LIBERTY AND [/LI] [LI] THE PURSUIT OF HAPPINESS. [/LI] [/LIST] [P] THAT TO SECURE THESE RIGHTS, GOVERNMENTS ARE INSTITUTED AMONG MEN, DERIVING THEIR JUST POWERS FROM THE CONSENT OF THE GOVERNED. [/P]

FIG. 2
*(Prior Art)*

CONTROL OF DOCUMENT CONTENT HAVING EXTRACTION PERMISSIVES

BACKGROUND OF THE INVENTION

1. Field of the Invention

This invention relates to the presentation of electronic documents and more particularly to the protection of electronic text.

2. Description of the Related Art

Documents are increasingly being represented as digital bits of data and stored in electronic databases as electronic documents. These documents often appear as electronic versions of articles, newspapers, magazines, journals, encyclopedias, books, and other printed materials. Such electronic documents are typically comprised of miscellaneous strings of characters, words, sentences, paragraphs, or documents of indeterminate or varied lengths and may include a wide variety of data classifications, such as alphanumerics, symbols, graphics, images, pictures, audio or bit sequences of any sort and combination.

Electronic documents are easily available and accessible by electronic devices and may further be republished by electronic devices with astonishing ease and expediency. Suitable electronic devices include, for example, computers, personal digital assistants, cell phones and other devices having processors, memory and display capability. These electronic devices may access the electronic documents over the Internet with a browser by downloading them onto a hard drive or other memory media. Alternatively, the electronic devices may access electronic documents that have been stored on memory media, such as CD-ROM, by downloading them from the memory media. Typically, a computer may be used to display the document on a monitor.

Modern word processing and text editing programs useful for displaying and editing such documents employ structured document architecture to provide greater control and flexibility in the displayed and printed appearance of documents prepared with the programs. Structured document architecture is described, for example, in the U.S. Pat. No. 5,285,526, which is fully incorporated herein by reference A structured document can be prepared in accordance with the standardized general markup language, such as is described by the International Organization for Standards in its Standard 8879-1986. A data stream of text marked up in accordance with the standardized general markup language, will have its text divided into elements consisting of a begin tag, then its content and then an end tag to terminate it when necessary. Within a WYSIWYG (what you see is what you get) editor, text is displayed to the user as it will appear when it is printed, even though its structure is defined by the begin tags and end tags for each element of text. Formatting of the elements within a structured document is done when the document is displayed to the user. Those elements which fall into the category of commonly used elements include, for example, paragraphs, simple lists, ordered lists, bulleted lists, and list items.

FIG. 1 is a schematic diagram of a structured document with element tags and associated text. The document elements 28-38 are organized in a formatted text stream having an ordered sequence, using structured document notation, where the ordered sequence is specified by a corresponding ordered sequence of the plurality of element tags. Each element shown in FIG. 1 is a structured document element having a begin tag and an end tag including, for example, the first paragraph 28, which includes a begin tag [p], the text of the paragraph and then an end tag [/p]. The begin tag and the end tag serve to identify the element type, in this case indicating a paragraph. The order of occurrence of the WYSIWYG display of the first paragraph 28 on a display is determined by the order of occurrence in the formatted text stream of the structured document element representing the first paragraph 28 within the context of the order of occurrence of the other structured document elements, as for example, the list 30 and the second paragraph 38.

FIG. 2 is a schematic diagram of a memory organization of element tags and associated text. The order of occurrence of the structured document elements such as the first paragraph 28, the list 30 and the second paragraph 38, can be determined by their order of occurrence in the formatted text stream that is stored in a computer memory 22. FIG. 2 shows that the structured document text, with its tags of FIG. 1, has been stored in the memory 22 in a linear sequential order, which is the formatted text stream 25. Paragraph element 28 includes tags 28*a* and 28*b* and text 28*c*. List element 30 includes tags 30*a* and 30*b*. List item element 32 includes tags 32*a* and 32*b* and text 32*c*. List item element 34 includes tags 34*a* and 34*b* and text 34*c*. List item element 36 includes tags 36*a* and 36*b* and text 36*c*. Paragraph element 38 includes tags 38*a* and 38*b* and text 38*c*.

Authors and publishers place considerable proprietary value on the textual passages that they generate (e.g., newspaper and magazine articles). However, the ease in which textual passages can be duplicated in electronic storage media presents a problem in that such passages can be copied and/or incorporated into larger documents without proper attribution or remuneration to the original author. This duplication can occur either without modification to the original passage or with only minor revisions such that original authorship cannot reasonably be disputed.

Publishers have a compelling need to ensure that all manuscripts that have been submitted to them for publication are, in their entirety, original works of authorship. Alternatively, for those manuscripts that are not original works of authorship in their entirety, the publishers have a compelling need to ensure that all copied portions are properly cited as to their original source and, when necessary, that the owner of each copied portion has granted permission for the inclusion of the copied portion in a new publication.

Furthermore, authors and researchers often conduct research to obtain a large quantity of information gathered from other sources, such as documents, books and articles. Often the quantity of the gathered information becomes so large that the author-researcher becomes overburdened with maintaining the source attribution for some of the gathered information, resulting in an embarrassing accusation of plagiarism after the author's work has been published that includes portions not properly cited to an original work. Even though the plagiarism may have been inadvertent, such accusations of plagiarism may still cause extensive damage through embarrassment, damage to reputation, loss of scholarly credit and financial detriment.

Thus, there is a need for methods and systems to properly protect original works from being copied in a manner not acceptable to the owner and to protect publishers from accepting manuscripts that fail to provide proper attribution to the original authors or fail to provide the required consent to publish from the original owners. Additionally there is a need to provide bibliographic systems and methods that help protect authors from committing inadvertent plagiarism.

SUMMARY OF THE INVENTION

Embodiments of the present invention include methods, computer program products and systems for controlling the content of an original document. In a particular embodiment of a method of the present invention, the method includes the step of limiting extractions from the original document to discrete defined portions by enforcing one or more extraction permissives associated with the document. The extraction permissives limit extraction to the discrete defined portions that may be selected from a character, a word, a quoted string, a sentence, a paragraph, a tag, a header or combinations thereof. At least one of the one or more permissives may be recognized as applying globally across the entire document.

This particular embodiment of the method further includes the step of decrypting the document to allow displaying the document only through a document control editor. According to this method, the document was encrypted before being published so that the extraction permissives may be enforced by allowing the decrypted document to be shown only within a document control editor that is capable of identifying and enforcing the extraction permissives. The method further includes the step of assembling a manuscript using a text portion that has been extracted from the original document and one or more extraction permissives the extracted portion, wherein the extracted portion can be displayed in decrypted form only through the document control editor.

It should be noted that in practicing embodiments of the present invention, the term "document control editor" comprises the same or different implementations of the document control editor. Therefore, for example, the implemented document control editor that decrypted the original document may be the same implementation or a different implementation of the document control editor through which the decrypted portion of the manuscript is displayed. Those having ordinary skill in the art will recognize that when particular embodiments of the present invention are implemented, for example, on systems of desk top computers, each computer system comprises a separate implementation of at least one document control editor.

In a particular embodiment of the present invention, the method may further include the steps of receiving an extraction instruction to extract an identified portion of the decrypted original document and determining that the extraction instruction is in compliance with the one or more extraction permissives. If the extraction instruction is in compliance with the permissives, then the instruction is executed by extracting the identified portion along with any extraction permissives associated with the identified portion. The method may then permit insertion of the extracted portion in a decrypted form only into the manuscript opened within the document control editor. This prevents the extracted portion of the original document from being displayed in a readable form, for example, in a typical word processor that does not recognize or enforce the extraction permissives.

If the identified portion is extracted from a corresponding portion of the encrypted original document to provide the extracted portion, then the method may further include the steps of inserting the extracted portion of the original document into the manuscript in encrypted form with associated permissives and decrypting the extracted portion for display through the document control editor. Alternatively, the method may include the steps of encrypting the extracted identified portion, inserting the encrypted extracted portion with associated permissives into the manuscript and decrypting the extracted portion for display through the document control editor. Optionally, the method may include a step of storing the manuscript with the extracted portion encrypted.

If particular embodiments of the method determine that the extraction instruction does not comply with one or more of the extraction permissives, then the method may further include the step of aborting the extraction instruction. Additionally, the method may include the steps of communicating a message to an end user that the extraction instruction does not comply with one or more of the extraction permissives and indicating one or more extraction alternatives that do comply with the one or more extraction permissives. Such indication may include, for example, highlighting on the display screen a permissible extraction that includes the portion that was sought to be extracted.

Particular embodiments of the present invention may further include methods having the step of extracting one or more bibliographic attributes associated with the extracted portion, wherein the one or more bibliographic attributes are selected from title, author, owner, publisher, date of publication, page number, chapter number, volume number or combinations thereof. The method may further include inserting the one or more bibliographic attributes into a bibliography section of the document control editor, maintaining an association between the extracted portion and the on or more bibliographic attributes and providing a citation according to the one or more bibliographic attributes in the manuscript adjacent to the extracted portion inserted in the manuscript.

If an end user tries to paste an extracted portion from an original document and its associated bibliographic attributes into a word processor, the word processor can display the bibliographic attributes but cannot display the encrypted extracted portion. Optionally, an exemplary method of the present invention may include the steps of receiving the one or more bibliographic attributes by the document control editor without receiving an extracted portion associated with the bibliographic attributes and searching the original document for a duplicate portion that corresponds to the bibliographic attribute. Upon finding the duplicate portion, the method continues with extracting the duplicate portion for insertion into the manuscript and decrypting the extracted duplicate portion for display only through a document control editor.

Embodiments of the method of the present invention may further include sending the manuscript to a publishing authority of the original document and receiving permission from the publishing authority to publish the manuscript containing the extracted portion, wherein the permission includes modification of the associated extraction permissives. Furthermore, the method may include the step of receiving a new permissive in the manuscript inserted by the publishing authority and directed to the extracted portion, wherein the new permissive grants publishing authority.

In a particular embodiment of the present invention, a computer program product for controlling content of an original document is provided comprising a computer useable medium having a computer readable program, wherein the computer readable program when executed on a computer causes the computer to limit extractions from the original document to discrete defined portions of the original document by enforcing one or more extraction permissives associated with the document, wherein the discrete defined portions are selected from a character, a word, a quoted string, a sentence, a paragraph, a tag, a header or combinations thereof. The computer may further be caused to decrypt the document to allow displaying the document only through a document control editor, wherein the document was encrypted to enforce the extraction permissives. And further, the computer may be caused to assemble a manuscript having an extracted portion of the original document and one or more extraction permissives associated with the extracted portion, wherein the extracted portion can be displayed in decrypted form only through the same or different implementations of the document control editor.

Additionally, the computer program product may cause the computer to receive an extraction instruction to extract an identified portion of the decrypted original document, determine that the extraction instruction is in compliance with the one or more extraction permissives and, if in compliance, execute the extraction instruction by extracting the identified portion along with extraction permissives associated with the identified portion. Additionally, the program may cause the computer to permit insertion of the extracted portion in a decrypted form only into the manuscript opened within the document control editor and further, extract one or more bibliographic attributes associated with the extracted portion, wherein the one or more bibliographic attributes are selected from title, author, owner, publisher, date of publication, page number, chapter number, volume number or combinations thereof.

In further embodiments, the present invention provides a system on a client information processing system for controlling content of an original document, comprising one or more processors coupled to one or more memory devices and an input/output controller coupled to a display and a first file loaded into the one or more memory devices comprising an encrypted original document having one or more extraction permissives associated with the document. Additionally, the system may include a document control editor having a logical structure to provide instructions to the one or more processors to limit extractions from the original document to discrete portions selected from a character, a word, a quoted string, a sentence, a paragraph, a tag, a header or combinations thereof in compliance with the one or more extraction permissives. The document control editor may further provide instructions for the one or more processors to decrypt the original document by using a decryption key and displaying the decrypted document on the display. Further, the system may include a second file loaded into the one or more memory devices comprising a manuscript having an extracted portion from the original document and one or more extraction permissives associated with the extracted portion, wherein display of the extracted portion in decrypted form is permitted only by the same or a different implementation of the document control editor.

In particular system embodiments of the present invention, a system may further include a user interface coupled to the input/output controller to communicate a request to the document control editor to extract an identified portion of the decrypted document displayed on the display. Furthermore, the document control editor may provide instructions to confirm that the request complies with the one or more extraction permissives and to place a copy of the identified portion within the one or more memory devices. Then, the user interface may further communicate a request to insert the extracted portion in an encrypted form into the manuscript at a specified location in the second file.

Additionally, particular embodiments of a system of the present invention may include the document control editor providing instructions to extract a bibliographic attribute associated with the extracted portion, wherein the bibliographic attribute is selected from title, author, owner, publisher, date of publication, page number, chapter number, volume number or combinations thereof.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIG. 1 is a schematic diagram of an example of a structured document with element tags and associated text.

FIG. 2 is a schematic of a memory organization of element tags and associated text.

DETAILED DESCRIPTION OF PARTICULAR EMBODIMENTS

Figure 3:
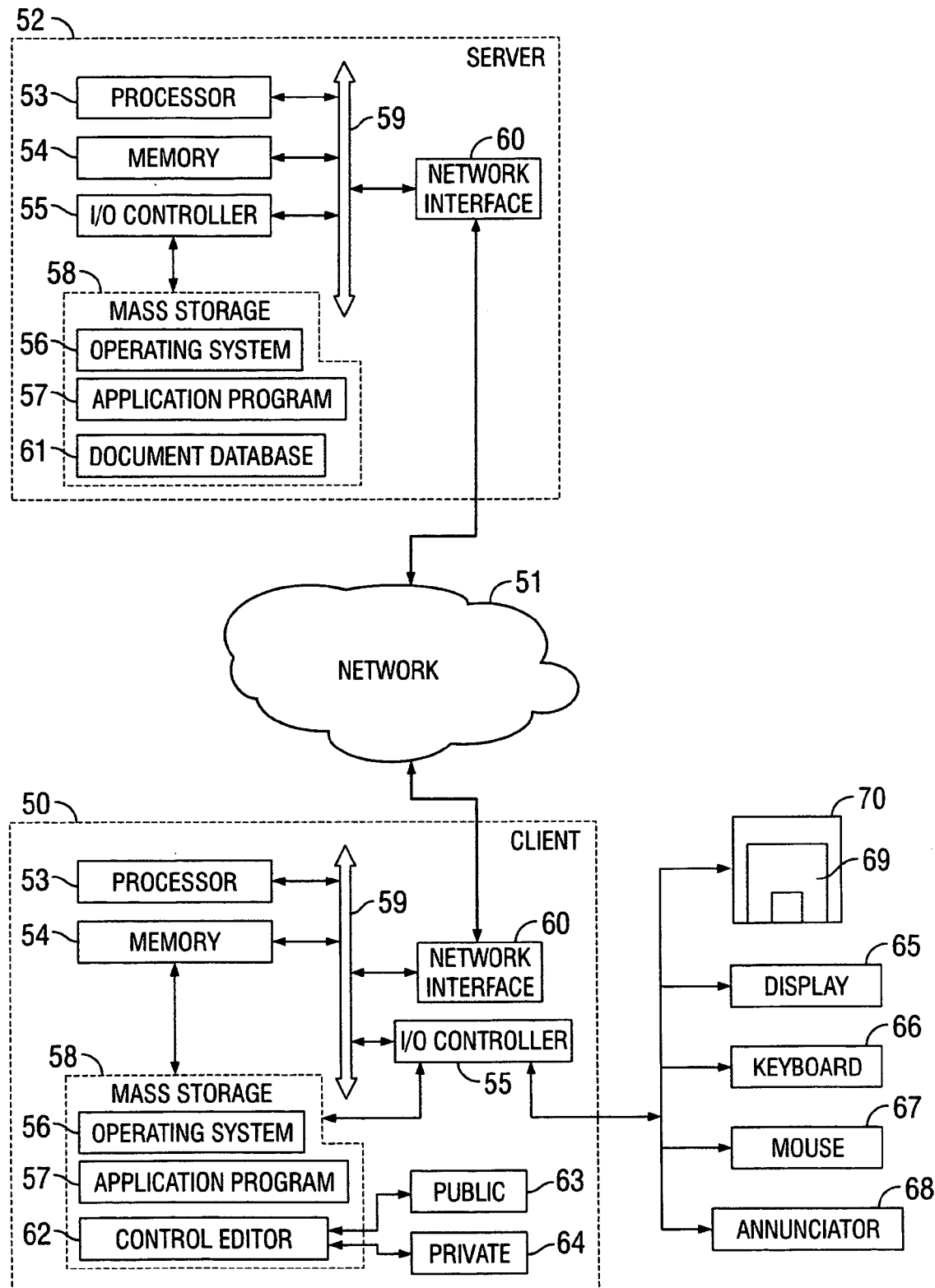
FIG. 3 is a schematic diagram of a system that is suitable for controlling the content of an original document.

The present invention provides methods, computer program products and systems for controlling the content of documents by including extraction permissives with the documents. The extraction permissives limit the extraction operations that can be performed on the documents. Extraction operations include, for example, cut, copy and paste operations, which are widely used in word processors, browsers or other computer software designed for assembling, writing, editing or compiling documents. In particular embodiments of the present invention, an end user who downloads or otherwise receives an original electronic document containing extraction permissives is not permitted unrestrained use of the cut, copy or paste operations.

In an embodiment of the present invention, a method is provided for controlling use of the content of an original document that contains extraction permissives. The method limits extractions from the original document to discrete defined portions by enforcing one or more of the extraction permissives that are associated with the document. The originator of the original document, who may be, for example, the author, distributor, publisher, owner, editor or combinations thereof, provides the extraction permissives with the original document to prevent an end user from extracting portions of the original document in a manner undesirable to the originator, such as to lose the originator's original meaning. For example, an original document may contain the statement, "The desire for money is the root of all evil." An end user could extract the text "money is the root of all evil" and in so doing, lose the originator's original intent.

The extraction permissives that are included with the document limit the extraction operations that may be performed on the document globally across the entire document, locally within the given document or combinations thereof. In any case, examples of the levels at which the permissives may limit extraction from the document include, as a non-exhaustive list, a level selected from a character, a word, a quoted string, a sentence, a paragraph, a tag, such as a LIST tag, a header or combinations thereof. In the example of the statement concerning the desire for money, an extraction permissive may be included that limits extraction of the quote to the entire sentence: "The desire for money is the root of all evil." The extraction permissive would then prevent an end user from extracting just the phrase "money is the root of all evil," which does not capture the originator's original intent.

The extraction permissives may be associated with the document in any suitable manner known to those having ordinary skill in the art. In a particular embodiment of the invention, the extraction permissives may be embedded in a document having structured document elements, with extraction permissives embedded with the tags of the structured documents as special extraction permissive labels. For example, a one sentence paragraph in a structured document having a special extraction permissive label may be held in a computer memory as "[P][X1] The desire for money is the root of all evil. [/X1][/P]." In this example, the P and X1 are both tags embedded in the structured document that indicate the beginning of a paragraph and the beginning of an extraction permissive named X1, respectively. /P and /X1 are both tags that indicate the end of the paragraph and the end of the extraction permissive named X1. The extraction permissive only allows extraction of the entire portion between the X1 and /X1 tags. Therefore, any instruction to extract just a part of the paragraph located between the local extraction permissive tags would be aborted or otherwise refused.

The extraction permissive tags may be nested. For example, a document may include document text with nested extraction tags such as [X1] . . . "(1) document text" [X2] . . . "(2) document text" [/X2] . . . (3) "document text" [/X1] . . . "(4) document text." In this example, an extraction instruction to extract only "(2) document text" would be executed but an instruction to extract "(1) document text" and "(2) document text" would be aborted as a violation of extraction permissive X1. However, an extraction instruction to extract "(1) document text," "(2) document text" and "(3) document text" would be executed since the instruction complies with the X1 extraction permissive.

Likewise, an extraction instruction to extract "(4) document text" would be executed after checking for the first extraction permissive before and after the portion to be extracted. Since the first extraction permissive before the portion is an "end" permissive, [/X1], and there is no permissive after the portion, there can be no extraction permissive associated with the portion to be extracted. Therefore, an instruction to extract "(4) document text" may be executed. It should be noted that particular embodiments of the present invention that include nested permissives search for extraction permissives on either side of a portion to be extracted or otherwise determine, for example through a table that lists all permissives, that there are no permissives associated with the selected portion to be extracted.

Global permissive tags may be included at the beginning of the document to provide permissives that are enforced throughout the document. For example, global permissive tags may include [Gp] and [GList], which would indicate that any extraction from a paragraph or a list in the document must include the entire paragraph or the entire list.

In the particular embodiment of the present invention, the method further includes the step of decrypting the document to allow displaying the document only through a document control editor. The original document is encrypted before being delivered to an end user so that the document can be displayed only through a special document control editor. Such encryption enforces the extraction permissives because the special document control editor is equipped to identify and enforce the extraction permissives associated with the document and unless the document is loaded into the document control editor for decryption, the document cannot be otherwise displayed. Furthermore, while the document control editor allows the document to be displayed to the end user, the document control editor prohibits the end user from accessing the extraction permissives contained in the document, thereby preventing the end user from modifying or deleting the extraction permissives. Optionally, the document control editor may allow an end user to view the permissives.

Encryption refers to a process of encoding a document to hide its content from anyone except an intended recipient. Decryption refers to the reciprocal process of recovering the original document by a recipient. Many encryption techniques as known to those having ordinary skill in the art are useful for implementing particular embodiments of the present invention. For example, two common encryption techniques, symmetric key encryption and public key encryption, are suitable for use with the present invention. In a symmetric key encryption, a unique key is identified and used by the originator of the document to encrypt the original document and then the same key is used by the end user to decrypt the original document. In public key encryption, separate keys are used to encrypt and to decrypt the original document.

Both symmetric key and public key encryption require a key exchange. That is, where symmetric key encryption is used, the author of the original document must provide the end user with the key so that the end user can decrypt the original document in the document control editor. In public key encryption, the author encrypts the original document using the end user's public key and then the end user utilizes the private key of the end user to decrypt the original document. The key exchange may be made in a variety of ways. One means includes the end user posting the public key to a central site accessible by the originator of the original document.

Alternatively, the public key may be provided by the end user directly to the originator of the original document. The document control editor may comprise instructions for exchanging the public key of the end user with the originator of the original document. For example, upon the end user first contacting a Web site having documents available for downloading, the Web site provides the document control editor of the end user with a pair of keys for use at that Web site. Upon the end user selecting a document to download, the document control editor provides the public key to the originator's Web site to enable the originator to encrypt the original document and then download it into the end user's document control editor. The document control editor then decrypts the encrypted original document by using the private key supplied to the end user. On subsequent visits to the Web site, the document control editor of the end user may present the public key to the originator who would recognize the public key as originating therefrom. Therefore, any additional documents obtained from that source would encrypt the original document with the previously obtained public key.

Advantageously, since the document control editor of the end user includes the public and private keys, the originator of the original document is assured that the original document may only be decrypted in a document control editor that recognizes and enforces the extraction permissives associated with the document. Therefore, the keys used for encrypting the original document should provide assurances to the originator that the decryption key can only be used in a document control editor that recognizes and enforces the extraction permissives associated with the document.

In a particular embodiment of the present invention, the method may further include the step of using the document control editor to assemble a manuscript that includes extracted portions of the original document. When portions of the original document are extracted from the document in compliance with the extraction permissives, the extracted portion may be pasted, copied or otherwise inserted into a manuscript that is loaded or opened in a document control editor. The extracted portion is allowed to be displayed only within an implementation of the document control editor to maintain the protection of the original document as downloaded or otherwise acquired by the document control editor. To ensure that the extracted portion is displayed only within the document control editor, the extraction operation extracts the extracted portion as an encrypted portion so that inserting the extracted portion anywhere other than in a manuscript opened in an implementation of the document control editor having the decryption key will not allow the pasted portion to be displayed in a readable format. The decryption key may be copied and made accessible to different implementations of document control editors.

It should be clear that the original document may be opened in one implementation of the document control editor and the manuscript into which the copied portion is inserted may be opened in the same or a different implementation of the document control editor. For example, the extracted portion may be pasted from the clipboard onto portable memory, such as a CD-ROM, and then carried to another computer to be copied into the manuscript opened in an implementation of the document control editor running on the second computer. However, since the extracted portion was encrypted, the extracted portion may only be displayed in an implementation of the document control editor that recognizes the encryption and decrypts the portion for display in the manuscript. Alternatively, if the opened manuscript and the original document are both open in the same document control editor, the document control editor may extract the identified portion and insert it into the open manuscript without first ensuring that the extracted portion was encrypted.

Particular embodiments of the present invention extract the extracted portion in encrypted form in different ways. In one particular embodiment, the extracted portion is extracted from the displayed document in decrypted form and then encrypted before the extracted portion is written to the clipboard or other memory media for later pasting into a manuscript. In another particular embodiment, the extracted portion is extracted from the corresponding portion of the encrypted document so that no additional encryption step is required before placing the extracted portion onto the clipboard.

Alternatively, a different implementation of the document control editor may request an identified extracted portion to be transferred to it from a first implementation of a document control editor. If extracted portions are transferred between different implementations of document control editors, it would be assured that extracted portions could not be displayed in applications other than document control editors that enforced the extraction permissives. While other alternatives may also be useful and known to one skilled in the art, particular embodiments of the present invention provide that the extracted portions cannot be displayed in decrypted form other than in an implementation of a document control editor capable of enforcing the extraction permissives contained in a document and having the necessary encryption and decryption capability.

In particular embodiments of the invention, bibliographic attributes may also be extracted from the document with the extracted portions. Such bibliographic attributes may include, for example, title, author, owner, publisher, date of publication, page number, chapter number, volume number or combinations thereof. The bibliographic attributes may be assembled in a bibliographic section of the document control editor that would maintain the association between each extracted portion and the bibliographic attributes pertaining thereto. The bibliographic attributes may be captured from, for example, the metadata included with the original document.

Advantageously, the document control editor may provide footnotes in the document that include the bibliographic attributes in a form selected from a set of standard forms or a custom form configured by the user. For example, the footnotes may appear at the bottom of each page of the manuscript or in a footnote section at the end of the manuscript as instructed by the end user. Footnotes may also be inserted so that they appear in a form that conform to a set of citation rules such as, for example, to legal citation rules. Footnotes may be numbered automatically so that when a new extracted portion is inserted into the manuscript, the footnote number is selected to maintain consecutively numbered footnotes throughout the manuscript. The contents of the footnote may also be selected by the end user from, for example, a menu so that those bibliographic attributes selected by the end user are shown in the footnotes.

Furthermore, particular embodiments of the present invention include finding a particular portion of the encrypted document when only the bibliographic attributes are known. For example, after extracting an encrypted portion and the bibliographic attributes associated therewith, an end user attempts to insert this material into a word processor. Since the word processor cannot read the encrypted portion, all that word processor may display are the bibliographic attributes. However, if the end user provides the bibliographic attributes to a document control editor that has access to the encrypted document, then the document control editor can extract the portion of the encrypted document that corresponds to the provided bibliographic attributes, decrypt that portion and display the decrypted portion for the end user.

In particular embodiments of the present invention, the manuscript containing the extracted portions of the original document may be published after obtaining publishing permission from the originator of the original document. The manuscript containing the extracted portions is sent to the publishing authority of the original document so that the publishing authority of the original document may review the manuscript, determine whether the extraction permissives were followed, and determine whether the use of the extracted portions were so great as to justify charging a fee for use of the extracted material. Such checking and determinations steps can be executed by a document control editor operating under the control of the publishing authority. For example, such a document control editor may identify the extracted portions contained within the manuscript and compare the extracted portion permissives in the manuscript to those of the original document to ensure that the permissives are identical and had not, therefore, been changed. Additionally, the editor may determine whether the extracted portion was greater than a fair use amount, wherein a fair use amount is an amount of extracted material that does not warrant additional charges to be levied for use of the material in another published document. Having determined that the manuscript should be published, the document control editor under the control of the publishing authority can then approve the extracted portions for publishing in the manuscript and return such approval to the end user owner or other authority for the manuscript. Such permissives can be obtained from any number of originators concerning any number of original documents.

Furthermore, as part of the approval step, the document control editor may modify or remove the extraction permissives relating to the extracted portions before returning the manuscript to the end user owner or other authority. Such extraction permissives may include, for example, grants of permission for viewing and printing the extracted portions contained in the manuscript but not permitting extraction of these parts from the manuscript for inclusion into another different manuscript. Alternatively, a permissive may include allowing the extracted portions to be copied freely as long as the original attribution is also copied with the extracted portions. Yet another permissive may require that the original document authority be notified if another manuscript containing the extracted portion is to be published so that permission may be granted for that publication. The manuscript may then be published with these permissives from the original document authority as well as any additional permissives included within the manuscript as assigned by the manuscript authority.

FIG. 3 is a schematic diagram of a system that is suitable for controlling the content of an original document. A server 52 is provided in communication with a client 50 through a communications network 51. The communications network 51 may include permanent connections, such as wire, coaxial cable or fiber optic cables, or temporary connections made through telephone lines or wireless communications. Personal computers and servers may be represented by a variety of computing devices, such as mainframes, personal computers, personal digital assistants and Internet-connected cellular telephones. The network may include additional servers, routers and other devices not shown. Specifically, the network 51 may include a telephone network, and a global computer communications network, such as the Internet, representing a worldwide collection of networks and gateways that use the TCP/IP suite of protocols to communicate with one another, an intranet, a local area network (LAN), or a wide area network (WAN).

Both the server 52 and the client 50 include conventional components such as a processor 53, memory 54 (e.g. RAM), a bus 59 that couples the processor 53 and memory 54, a mass storage device 58 (e.g. a magnetic hard disk and/or an optical storage disk) coupled to the processor 53 and memory 54 through an I/O controller 55 and a network interface 60, such as a conventional network interface card. The client further includes conventional input/output devices such as a display 65, a keyboard 66, a mouse 67 and an annunciator 68.

The present invention may be implemented in a variety of software environments. A typical operating system 56 may be used to control program execution within the server 52 and client 50. The server 12 includes a conventional server software program such as IBM's Websphere®, for administering the interaction with the client 50. Likewise, the client 50 includes a typical browser software program from communicating with the server 52.

It will be appreciated that the present invention may be implemented in software that is stored as executable instructions on a computer readable medium of the server 52 and client 50, such as the mass storage device 58, or in memory 54. Application programs 57 and an operating system program 56 reside on the mass storage device 58 and are loaded into memory 54 for execution. The operating system program 56 manages the resources of the server 52 and the client 50. The application programs 57 are user programs, performing tasks as required by the server 52 and client 50, including database management.

A document database 61 residing in the mass storage 58 of the server 52 stores original documents for downloading to the client 50 across the network 51. Application programs 57 residing on the server 52 may encrypt documents from the document database before transferring them to the client 50. Application programs 57 may include instructions for transferring public and/or private encryption keys 63, 64 between the server 52 and the client 50 as required for encrypting and decrypting the documents. The document control editor 62 also resides as at least a portion of an application program on the client 50.

Alternatively, an encrypted document may be loaded into the mass storage 58 of the client 50 by copying the document from a portable memory storage device 69, such as a CD-ROM, other optical disk and/or removable computer diskette inserted in a reader 70. A decryptor key may be included with the document on the portable memory storage device 69 to use to decrypt the document.

As noted, the present invention may be implemented in software, written in any suitable programming language well known in the art. In particular embodiments, such software interacts with word processors and may be implemented using Object Linking and Embedding (OLE) Component Object Model (COM) objects as known in the art. Both OLE and COM were developed by MICROSOFT.

The described example shown in FIG. 3 does not imply architectural limitations. For example, the client may be a notebook computer, a hand held computer, a personal digital assistant, another server or other electronic device having memory and processors. Likewise, the server may be replaced with similar electronic devices as the client. The methods of the present invention are performed by processors using computer implemented instructions that may be located in a memory.

It should be recognized therefore, that embodiments of the present invention may take the form of an entirely hardware embodiment, an entirely software embodiment or an or an embodiment containing both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer readable medium can be any apparatus that can contain or store the program for use by or in connection with the instruction execution system, apparatus or device.

Figure 4:
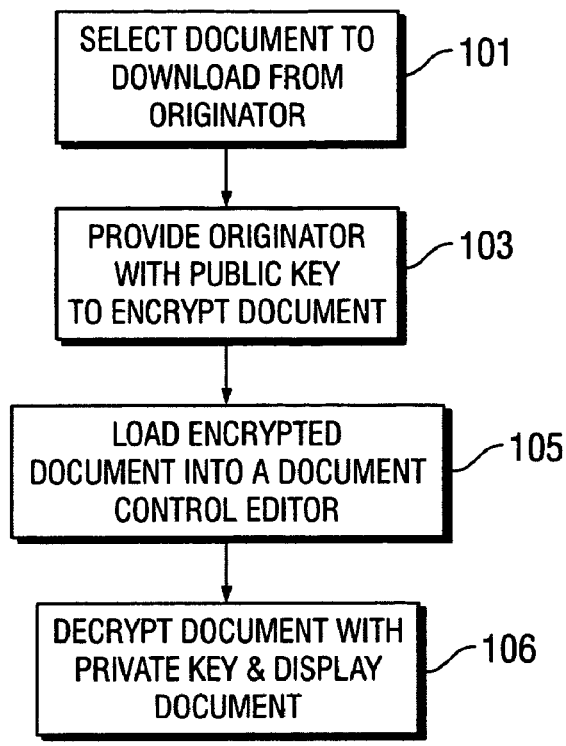
FIG. 4 is a flow diagram for displaying a decrypted document in a document control editor.

FIG. 4 is a flow diagram for displaying a decrypted document in a document control editor. While inventive embodiments of methods are demonstrated in this and the following flow charts, it should be realized that the demonstrated methods may be implemented using computer code and/or a suitable system. In state 101, an end user selects a document to be downloaded from a Web site of the originator. In state 103, the processor provides the originator with a public key to encrypt the selected document. In state 105, the document is downloaded into the document control editor where, in state 106, the document is decrypted using the private key so that the document can be displayed.

Figure 5:
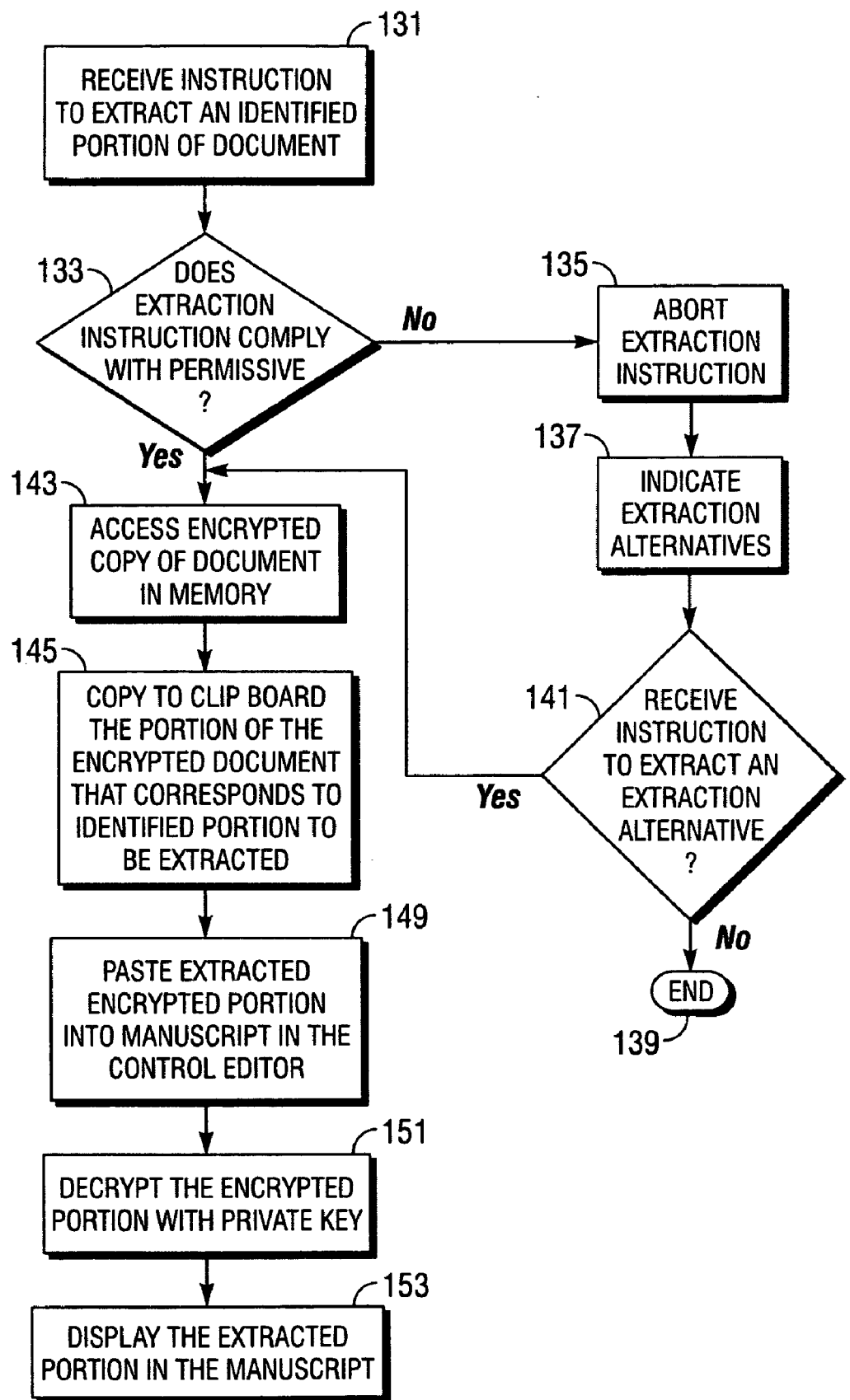
FIG. 5 is a flow diagram for extracting a portion of an original document and pasting the portion into a manuscript.

FIG. 5 is a flow diagram for extracting a portion of an original document and pasting the portion into a manuscript. After the encrypted document has been decrypted and displayed within the document control editor as described in FIG. 4, an end user may read and study the document in displayed in the document control editor and decide to extract a portion of the original document for use in a manuscript being prepared by the end user. The end user selects a portion of the original document to extract using, for example, a copy command as known to be part of the cut/copy/paste instructions in a word processor. In state 131, the processor receives the instruction to extract an identified portion of the identified document. In state 133, the processor determines whether the extraction instruction complies with any permissives associated with the identified portion by, for example, determining whether there are any extraction permissive tags associated with the identified portion. If the instruction does not comply with one or more extraction permissives, then in state 135, the processor aborts the extraction instruction and in state 137, indicates an alternative extraction that may be made in compliance with the extraction permissives. If, in state 141, a new instruction to extract an alternative extraction is not received, then in state 139, the method ends. If in state 141 a new instruction to extract an extraction alternative is received, then the method continues to state 143. Likewise, if, in state 133, the instruction does comply with the one or more extraction permissives, then the method continues to state 143.

In state 143, the processor accesses the encrypted copy of the document that is in memory. In state 145, the processor copies to the clipboard the portion of the encrypted document that corresponds to the identified portion to be extracted. In state 149, the processor, upon receiving an instruction to paste the encrypted portion from the clipboard, pastes the extracted encrypted portion into the manuscript in the document control editor. In state 151, the encrypted portion is decrypted using the private key and, in state 153, the extracted portion of the document is displayed as part of the manuscript.

Figure 6:
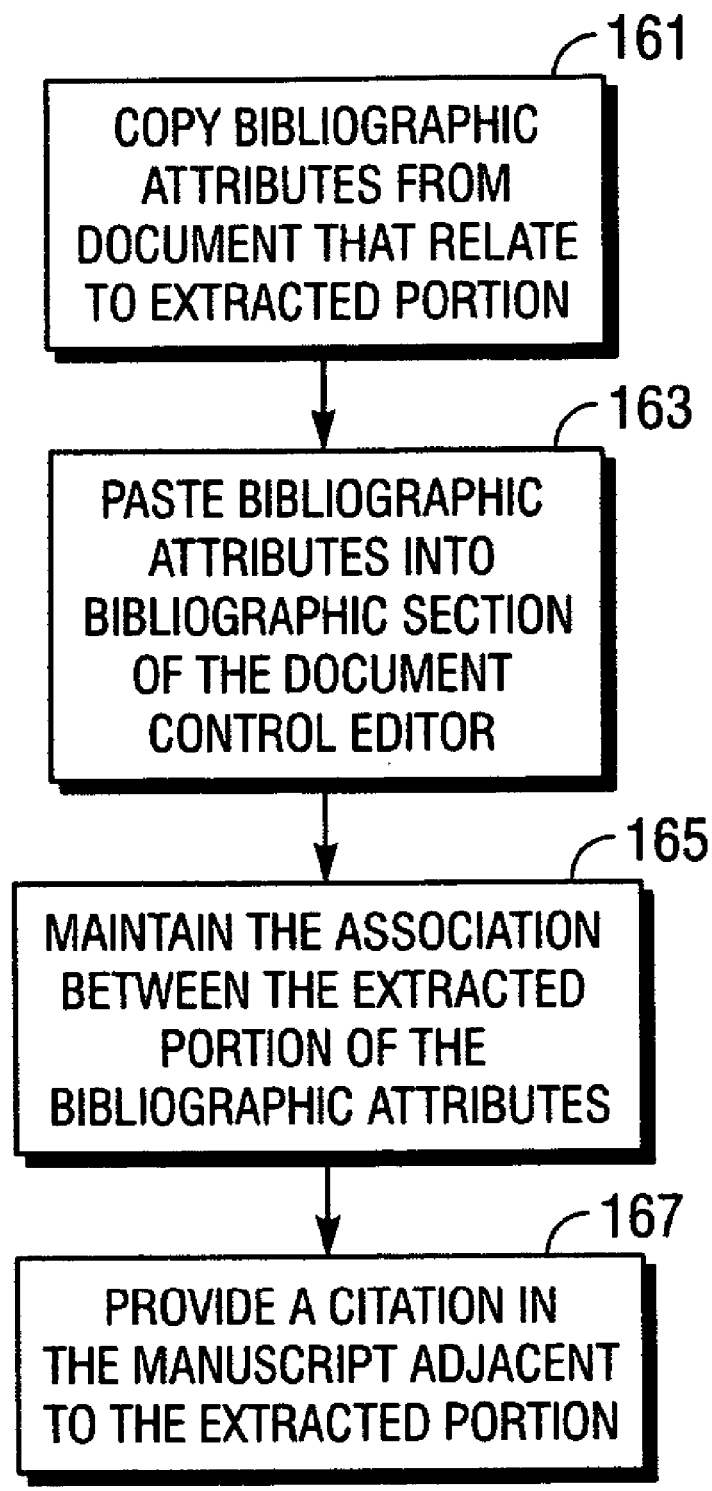
FIG. 6 is a flow diagram for extracting bibliographic attributes from an original document.

FIG. 6 is a flow diagram for extracting bibliographic attributes from an original document. In particular embodiments of the present invention, bibliographic attributes associated with a document are extracted whenever an identified portion of the document is extracted. In state 161, the processor copies bibliographic attributes that correspond to the extracted portion of the document. In state 163, the processor pastes the bibliographic attributes into the bibliography section of the document control editor. In state 165, an association is maintained between the extracted portion and the bibliographic attributes. In state 167, the processor provides a citation in the manuscript, such as a footnote, adjacent to the extracted portion.

Figure 7:
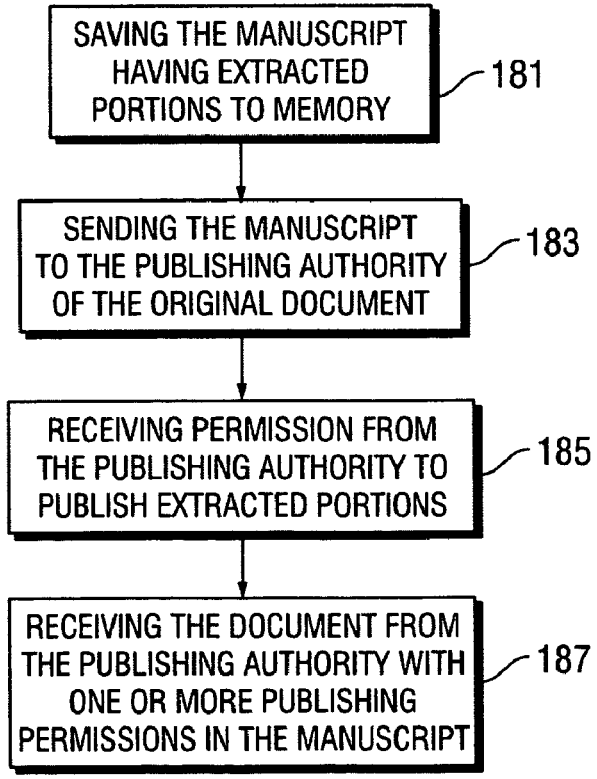
FIG. 7 is a flow diagram for obtaining publishing permission from the originator of the original document.

FIG. 7 is a flow diagram for obtaining publishing permission from the originator of the original document. In state 181, the processor saves the manuscript having the extracted portions of the document to memory. In state 183, the manuscript is sent to the publishing authority of the original document seeking publishing approval. In state 185, the processor receives permission from the publishing authority to publish the manuscript with the extracted portions and in state 187, the document is received from the publishing authority with one or more publishing permissives in the manuscript.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A method for controlling content of an original document, comprising the steps of:
   receiving the original document comprising one or more extraction permissives;
   limiting extractions from the original document to discrete defined portions by enforcing the one or more extraction permissives associated with the document, wherein the document was encrypted to enforce the extraction permissives;
   decrypting the document to allow displaying the document only through a document control editor;
   receiving an extraction instruction to extract an identified portion of the decrypted, document;
   determining that the extraction instruction is in compliance with the one or more extraction permissives;
   executing the extraction instruction by extracting the identified portion along with extraction permissives associated with the identified portion;
   inserting the extracted portion and the related extraction permissives into a manuscript;
   permitting display of the inserted extracted portion in a decrypted form only through a document control editor; and
   assembling the manuscript having the extracted portion from the original document and the one or more extraction permissives associated with the extracted portion.

2. The method of claim 1, wherein the identified portion is extracted from a corresponding portion of the encrypted document to provide the extracted portion in encrypted form, the method further comprising the steps of:
   inserting the extracted portion in encrypted form with the related extraction permissives into the manuscript; and
   decrypting the extracted portion for display only through a document control editor.

3. The method of claim 1, further comprising the steps of;
   encrypting the extracted identified portion;
   inserting the encrypted extracted portion with the related extraction permissives into the manuscript; and
   decrypting the extracted portion for display only through a document control editor.

4. The method of claim 1, further comprising the step of:
   extracting a bibliographic attribute associated with the extracted portion, wherein the bibliographic attribute is selected from title, author, owner, publisher, date of publication, page number, chapter number, volume number or combinations thereof.

5. The method of claim 4, further comprising inserting the bibliographic attribute into a bibliography section of a document control editor;
   maintaining an association between the extracted portion and the bibliographic attribute; and
   providing a citation in the manuscript adjacent to the extracted portion.

6. The method of claim 4, further comprising:
   receiving the bibliographic attribute by a document control editor without receiving the extracted portion;
   searching the original document for a duplicate portion that corresponds to the bibliographic attribute;
   extracting the duplicate portion for insertion into the manuscript; and
   decrypting the extracted duplicate portion for display only through a document control editor.

7. The method of claim 1, further comprising the steps of:
   receiving a second extraction instruction to extract a second identified portion of the decrypted document;
   determining that the extraction instruction does not comply with one or more of the extraction permissives; and
   aborting the second extraction instruction.

8. The method of claim 7, further comprising the steps of:
   communicating a message that the second extraction instruction does not comply with one or more of the extraction permissives; and indicating one or more extraction alternatives that do comply with the one or more extraction permissives.

9. The method of claim 1, wherein at least one of the one or more extraction permissives applies globally across the entire document.

10. The method of claim 1, wherein the discrete defined portions are selected from a character, a word, a quoted string, a sentence, a paragraph, a tag, a header or combinations thereof.

11. The method of claim 1, further comprising:
storing the manuscript with the extracted portion encrypted.

12. The method of claim 1, further comprising:
sending the manuscript to a publishing authority of the original document; and
receiving permission from the publishing authority to publish the manuscript containing the extracted portion, wherein the permission includes modification of the associated extraction permissives.

13. The method of claim 12, further comprising:
receiving a publishing permissive in the manuscript inserted by the publishing authority and directed to the extracted portion, wherein the publishing permissive is selected from permission for viewing and printing the extracted portion contained in the manuscript but not permitting extraction of the extracted portion from the manuscript for inclusion into a second manuscript, permission to allow the extracted portion to be inserted into the second manuscript if a bibliographic attribution to the original document is inserted with the extracted portion, require notification to the publishing authority if the second manuscript is to be published and combinations thereof.

14. A computer program product for controlling content of an original document comprising a computer useable medium storing a computer readable program, wherein the computer readable program when executed on a computer causes the computer to:
limit extractions from the original document to discrete defined portions by enforcing one or more extraction permissives included within the original document, wherein the discrete defined portions are selected from a character, a word, a quoted string, a sentence, a paragraph, a tag, a header or combinations thereof;
decrypt the document to allow displaying the document only through a document control editor, wherein the document was encrypted to enforce the extraction permissives;
receive an extraction instruction to extract an identified portion of the decrypted document;
determine that the extraction instruction is in compliance with the one or more extraction permissives;
execute the extraction instruction by extracting the identified portion along with extraction permissives associated with the identified portion;
permit insertion of the extracted portion in a decrypted form only into a manuscript opened within the document control editor; and
assemble the manuscript having the extracted portion from the original document and one or more extraction permissives associated with the extracted portion, wherein the extracted portion can be displayed in decrypted form only through the document control editor.

15. The computer program product of claim 14, wherein the computer readable program when executed on a computer further causes the computer to:
extract a bibliographic attribute associated with the extracted portion, wherein the bibliographic attribute is selected from title, author, owner, publisher, date of publication, page number, chapter number, volume number or combinations thereof.

16. A system on a client information processing system for controlling content of an original document, comprising:
one or more processors coupled to one or more memory devices and an input/output controller coupled to a display;
a first file loaded into the one or more memory devices comprising an encrypted original document having one or more extraction permissives included within the original document;
a document control editor having a logical structure to provide instructions to the one or more processors to limit extractions from the original document to discrete defined portions selected from a character, a word, a quoted string, a sentence, a paragraph, a tag, a header or combinations thereof in compliance with the one or more extraction permissives;
the document control editor further providing instructions for the one or more processors to decrypt the original document by using a decryption key and displaying the decrypted document on the display;
a user interface coupled to the input/output controller to communicate a request to extract an identified portion of the decrypted document displayed on the display;
the document control editor further providing instructions to confirm that the request complies with the one or more extraction permissives and to place a copy of the identified portion within the one or more memory devices;
the user interface further communicating a request to insert the extracted portion in an encrypted form into a manuscript at a specified location in a second file; and
wherein the second file is loaded into the one or more memory devices and comprising a manuscript having the extracted portion from the original document and one or more extraction permissives associated with the extracted portion, wherein display of the extracted portion in decrypted form is permitted only by the document control editor.

17. The system of claim 16, further comprising:
the document control editor providing instructions to extract a bibliographic attribute associated with the extracted portion, wherein the bibliographic attribute is selected from title, author, owner, publisher, date of publication, page number, chapter number, volume number or combinations thereof.

* * * * *